March 17, 1959
H. A. BURGERT
2,877,831
SPRING FRAME FOR THE UPHOLSTERY OF SEATS AND/OR BACK RESTS
MORE PARTICULARLY FOR THE SEATS IN MOTOR VEHICLES
Filed March 28, 1957
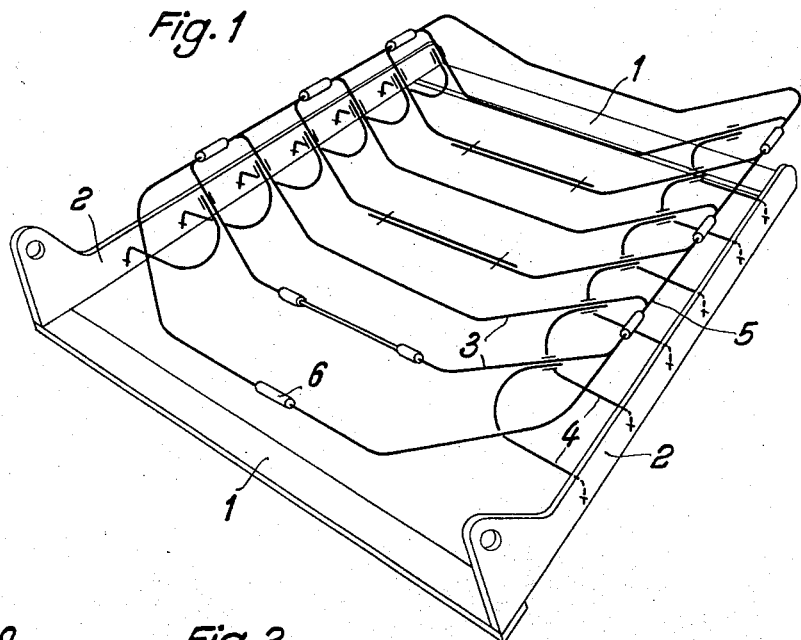
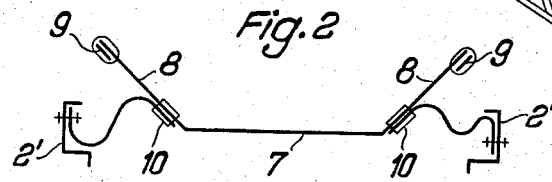
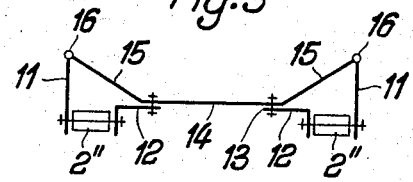
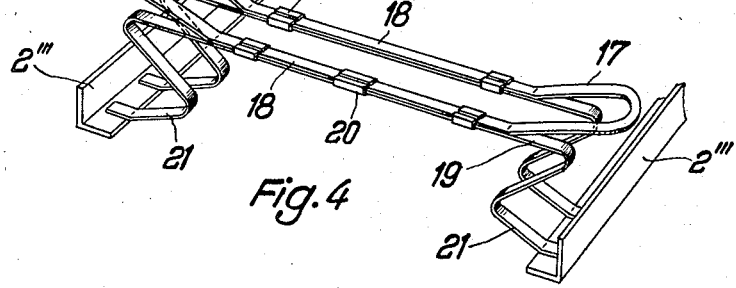
Inventor:
H. A. Burgert

United States Patent Office 2,877,831
Patented Mar. 17, 1959

2,877,831

SPRING FRAME FOR THE UPHOLSTERY OF SEATS AND/OR BACK RESTS MORE PARTICULARLY FOR THE SEATS IN MOTOR VEHICLES

Herbert Anton Burgert, Porza, Tessin, Switzerland, assignor to IGMA A. G., Zurich, Switzerland Application March 28, 1957, Serial No. 649,247

Claims priority, application Switzerland April 26, 1956

7 Claims. (Cl. 155—179)

This invention relates to a spring frame for the upholstery of seats and/or back rests more particularly in motor vehicles, comprising spring bands stretched crosswise or lengthwise of the seat or back rest and elastic supporting members rigidly joined to each end of the bands and extending obliquely outwards either upwards or forwards so as to impart to the seat or back rest a substantially trough-shaped conformation.

Spring frames for upholstery in which lateral supporting members impart a trough-shaped conformation to a seat and/or its back rest are already known to the art. One such known arrangement is based upon the conventional form of upholstery used for a back rest and substantially comprises spring-bands stretched in parallel from one side of a frame to the other. The lateral supporting members are embodied in spring wire elements twisted for attachment on to the individual loops of the sinusoidally flexed wires which constitute the spring bands, the flexurally rigid supporting members extending from their points of attachment obliquely outwards and forwards. Naturally, increased stresses arise at the points of attachment of the supporting members to the spring bands whenever the outer ends of the supporting members support a load.

It is therefore a disadvantage inseparable from this type of sprung upholstery that the supporting members tend to be permanently deformed at the points where they are attached to the spring bands or that, when particularly stiff supporting members are used, the spring bands tend to be over-elongated and hence over-stressed at the points of attachment of the supporting members. Moreover, when the upholstery is frequently used it is practically impossible to prevent the supporting members which are attached merely by being twisted over the spring bands from working loose and incidentally causing undesirable squeaking noises as well as premature chafing of the wire at the points of attachment.

In another known type of spring frame for upholstery the ends of parallel lengths of spring band extend no further than into the vicinity of the frame of the seat and are suspended from V-shaped brackets of which one shank is bent in the direction of the relative frame member to which it is secured, whereas the other shank provides the supporting arm and rises obliquely outwards and upwards out of the plane containing the lengths of spring band or, in the case of a back rest, outwards and forwards. In other words, the lengths of spring band in this type of spring frame for upholstery are connected with the supporting elements or brackets by means of joints which are subject to frictional chafing whenever the seat is used and which are therefore liable to considerable wear besides also giving rise to undesirable noise.

The present invention avoids these disadvantages in the case of spring frame assemblies of the kind hereinbefore described by connecting together at least opposite supporting elements to form a single integral structural unit. In such a form of construction of the supporting elements there is a jointless flexurally rigid connection at the points where the supporting elements rise angularly from the general plane containing the spring bands and this precludes any loosening or wear by chafing from occurring at all.

In an arrangement of the upholstery spring frame according to the present invention it is preferred that the two outer ends of neighbouring supporting members should be combined into one unit by means of an arched interconnecting section and that the spring material forming the supports should at the same time incorporate the opposite supporting members in one integral element forming a closed ring. When the supporting members are constituted in the manner described the principal elements of the springing can be made in an extremely simple way and at the same time the advantages secured that have been already outlined. The intermeditae sections between opposite supporting members may bear directly for example on the sections of the spring bands and be secured to them—for instance by means of metal clips, a particularly simple fastening if both the bands and the supporting members are made of flat spring steel strip. Flat spring steel strip is easily obtainable and compared with spring wire of similar flexural stiffness it may be of thinner gauge so that the springing will add less to the total thickness of the upholstered back rest or seat.

According to a further feature of the invention the intermediate sections between opposite supporting members may themselves form the adjoining middle sections so that the previously required separate middle sections of the spring bands can be saved.

For attaching the spring bands to the frame of the seat use is made of bracket members which extend from the bands to the frame in the region of the supporting members. The bracket members may be formed for instance from the opposite free ends of the spring bands and extend downwards towards the longitudinal frame members in the form of the letter S, or alternatively they may be embodied in arcuately bent lengths of band which are attached to the parts of the supporting members extending obliquely outwards and which form the only means of attachment of the spring assembly to the framework of the seat, or they may take the form of supports extending roughly vertically upwards or forwards from the frame and supporting at their ends a closed ring-shaped wire frame which encircles the entire spring assembly and is attached to the outer ends of all the supporting members.

Further details and modifications of the invention will be hereinafter described with reference to the drawings which illustratively represent four different forms of construction of the invention.

Figure 1 is an angular perspective view from above of one embodiment of a spring frame for an upholstered seat according to the invention;

Figure 2 is a second embodiment of a spring frame for an upholstered seat, shown diagrammatically in a section parallel with the spring band.

Figure 3 is a third embodiment of the spring frame of an upholstered seat likewise shown in the form of a cross section corresponding to that of Figure 2, and Figure 4 is a fourth embodiment of part of a spring frame for an upholstered seat, shown in perspective from the same angle as that in Figure 1.

In the first embodiment the frame of the upholstered seat, as shown in Figure 1, consists of two transverse members 1 and two longitudinal members 2, the spring assembly for supporting the upholstery being attached to the two longitudinal members 2.

Substantially the spring assembly consists of spring bands 3 stretched across between the longitudinal frame members, each two neighboring lengths of spring band being connected to form a narrow closed rectangle of which the two end sections adjacent the longitudinal members of the frame are angled outwardly upwards so as to rise from the plane containing the frame of the seat and thus to form the supporting members which give the entire assembly a substantially trough-shaped conformation. Attached to the obliquely upwardly and outwardly angled ends of the said rectangles are arcuately bent bracket members formed from pieces of similarly stiff spring band 4, which from their point of attachment first extend in the direction of the spring band to which they are joined, towards the centre of the spring assembly and which are then arcuately reflexed downwards and outwards to enable their other ends to be secured to the longitudinal members 2 of the frame of the seat.

The narrow sides of the individual oblong rectangles which incorporate the supporting members are interconnected by means of an edge wire 5 which encircles the entire assembly in the form of a closed wire frame of which the contours at the transverse ends of the frame are adapted to the trough-shape of the assembly. The ends of the wire forming the encircling frame are rigidly and securely joined together by means of a sheet-metal clip, for instance at point 6. Similar joints are provided in each of the individual rectangles formed by the spring band of which the ends are preferably arranged to overlap to enable them, in each rectangle, to be joined rigidly at two points by two separate fastenings. Like fastenings are also provided along the transverse sections of the outer rectangles for connecting the same with the encircling wire frame 5.

The spring assembly that has been described includes no joints that could give rise to undesirable noise or to defects, and the integral construction of the supporting members and the centre sections of the lengths of spring band is extremely reliable in preventing the spring assembly from being overstressed for instance at the inflexion points of the supporting members. In the second illustrative form of construction of a spring assembly shown in Figure 2 the two longitudinal members 2' of the frame are likewise transversely interconnected by rectangles consisting of lengths of flat spring band. In the drawing the middle sections of the spring band which are approximately level with the frame of the seat are indicated by reference numeral 7 whereas their outwardly and upwardly angled integral extensions which form the supporting members are indicated by 8. Again the outer free ends of the supporting members are fastened to an encircling wire frame which in this instance consists of flat spring strip 9. The narrow rectangles comprising the sections of spring band 7 and the supporting members 8 are suspended from the longitudinal members 2' of the main frame by means of flexurally rigid arcuate bracket members secured by sheet metal clips 10 to the lower ends of the supporting members 8 in close proximity to the points where these rise from the transverse band sections 7. From their points of attachment they first extend in the direction of the individual supporting members 8 in the outward and upward direction and are then reflexed in a double arc towards the adjacent longitudinal member 2' to which their outer ends are secured. This spring assembly is also entirely free of flexible joints and includes no structural features that might give rise to overstressing and undesirable noise.

As in the first hereinabove described embodiment where the bracket members 4 relieve the stress arising at the junctions of the supporting members and the middle sections of the spring bands, the corresponding bracket members in this second embodiment likewise help to relieve the stresses arising at the junctions between the supporting members 8 and the middle lengths of the spring bands 7.

In the spring assembly constructed in a third embodiment shown in Figure 3, the outer sides of the longitudinal members 2" carry flat upright supports 11 and the inner edges of the longitudinal members 2" at the same time carry angle pieces 12. The upper arms of these angle pieces are arranged to be level with the plane containing the main-frame of the seat and their free ends 13 support the centre sections 14 of the lengths of spring band which are bent to give a trough-like shape. At these supporting points the angle members 12 and the spring bands are firmly connected together the outer ends of the spring bands being upswept to provide the lateral supporting members of the trough-shape thus formed. The upper extremities of the upright supports 11 carry the encircling wire frame which is at the same time attached to the outer ends of the supporting members 15, for instance in the manner already explained with reference to the first hereinabove described form of construction.

The spring frame as constructed in this last embodiment again makes use of the main feature of the invention though it differs from the previous forms of construction in other respects. Whereas in the previous embodiments the spring suspension of the upholstery despite its simple and advantageous design provides a very soft and resilient springing, a spring suspension according to the third example is extremely robust in construction and therefore especially suitable for particularly hard wear.

The upholstery spring frame illustrated in the last illustrative example (cf. Figure 4) likewise incorporates supporting members 17, the external ends of each two neighbouring members being integrally connected by an arched intermediate section so that the spring band which forms these elements constitutes a closed ring incorporating also the supporting members 17 on the other side of the frame.

However, whereas in the embodiments that have been so far described the sections connecting opposite supporting members also constituted the middle sections of the relative spring band, the sections connecting opposite supporting members 17 in the example shown in Figure 4 bear on the top of the lengths 19 of spring band with which they are co-directional and to which they are secured by sheet metal clips 20. A similar sheet metal clip 20 may likewise be provided to join the overlapping ends of the length of spring band formed into a closed ring with a rectangular perimeter.

The rings comprising the supporting members 17 as well as the lengths of spring band 19 actually consist of flat spring steel strip, the flat side of which faces the surface of the seat or back rest so that it adds little to the total sectional thickness of the upholstery. By embodying the spring band in flat spring steel strip the rings comprising the supporting members 17 and their middle sections 18 can easily and reliably be attached in the manner that has been described to the flat steel strip forming the spring band 19.

It will also be readily understood by reference to Figure 4 that the free ends of the spring band 19 may be modified to form an integral bracket member 21 of roughly S-shape extending downwards for attachment in some suitable manner to the longitudinal frame members 2'''.

In an upholstery spring frame constructed as described with reference to the last embodiment the connection between the individual supporting members 17 and the longitudinal frame members 2''' is flexurally sufficiently rigid to permit a wire frame encircling all the supporting members to be dispensed with. However, there is no reason why nevertheless such a wire frame should not be provided if this were considered desirable.

The lengths of spring band used in the construction of a spring assembly according to the present invention may preferably consist of flat-rolled spring steel strip, as hereinbefore mentioned, or it may be formed of spring steel wire of some other suitable sectional profile, and according to the varying specific stresses arising in one and the same seat or back rest spring bands and supporting members of different elastic characteristics may be used for instance by employing different kinds of cross sections. An alternative material would be a suitable strong elastic plastic, such as a copolymerization product of a kind nowadays readily available. Such elastic plastic bands have the advantage of a lower weight by comparison with spring steel strip.

Whereas the edge wire 5 in Figure 1 stretches along those edges of the seat or back rest that are parallel with the spring bands without the provision of additional means of support, this wire may be joined to the neighbouring spring band by means of one or several reinforcing elements not shown in the drawing. Furthermore the rigid connection between the individual constituent parts of the spring assembly which is effected in the illustrated embodiments by means of sheet metal clips or sleeves may alternatively be established in a simple way of spot welding or by adhesives, a method which will afford further economies especially in the mass production of such spring frames for upholstered seats.

I claim:

1. A spring frame assembly for upholstered seats or back rests, more particularly for vehicles, comprising: a flat frame, elastic bracket members each rigidly secured by one end to one of two opposite sides of the said frame, spring bands extending across the frame and united to one another in pairs at both ends by arcuate portions so as to form elongated loops, the straight portions of each loop being rigidly secured near each end to one of the said brackets, and the end portions of the loops being bent upwards at an angle so as to form elastic supporting members and to impart to the seat or back rest a substantially trough-shaped conformation.

2. A spring frame assembly as claimed in claim 1, each two opposite elastic bracket members being formed integrally with one another from a single strip of material, and the middle portion of each loop resting directly upon two such adjacent strips, and being firmly attached thereto.

3. A spring frame assembly as claimed in claim 1, the bracket members and the looped spring bands being made of flat spring-steel strip.

4. A spring frame assembly as claimed in claim 1, the elastic bracket members being of S-shaped formation, and extending downwards from the spring bands to the frame.

5. A spring frame assembly as claimed in claim 1, the elastic bracket members constituting the only means of attachment of the spring assembly to the frame of the seat.

6. A spring frame assembly as claimed in claim 1, further comprising an edge wire encircling the assembly in the manner of a wire frame, and inter-connecting the outer ends of the elastic supporting members formed by the ends of the loops.

7. A spring frame assembly as claimed in claim 1, further comprising a flat spring band encircling the assembly in the manner of a wire frame, and inter-connecting the outer ends of the elastic supporting members formed by the ends of the loops.

References Cited in the file of this patent
UNITED STATES PATENTS 2,722,267    Liljengren _____ Nov. 1, 1955
2,798,233    Robell _____ July 9, 1957